United States Patent
Peskens et al.

(10) Patent No.: US 9,944,816 B2
(45) Date of Patent: Apr. 17, 2018

(54) CROSSLINKABLE BINDERS FOR SOLVENT BASED INTUMESCENT COATINGS

(71) Applicants: Ronnie Peskens, Allison Park, PA (US); Venkateshwarlu Kalsani, Gibsonia, PA (US); Seiko Fujii Sisco, Glenshaw, PA (US); Brianne Hodanich, Allison Park, PA (US); Thomas de Boer, Halfweg (NL)

(72) Inventors: Ronnie Peskens, Allison Park, PA (US); Venkateshwarlu Kalsani, Gibsonia, PA (US); Seiko Fujii Sisco, Glenshaw, PA (US); Brianne Hodanich, Allison Park, PA (US); Thomas de Boer, Halfweg (NL)

(73) Assignee: PPG Coatings Europe B.V., Amsterdam (NL)

( * ) Notice: Subject to any disclaimer, the term of this patent is extended or adjusted under 35 U.S.C. 154(b) by 59 days.

(21) Appl. No.: 15/170,975

(22) Filed: Jun. 2, 2016

(65) Prior Publication Data

US 2017/0349776 A1 Dec. 7, 2017

(51) Int. Cl.
*C08F 212/08* (2006.01)
*C09D 125/08* (2006.01)
*C09D 5/18* (2006.01)

(52) U.S. Cl.
CPC .......... *C09D 125/08* (2013.01); *C08F 212/08* (2013.01); *C09D 5/185* (2013.01)

(58) Field of Classification Search
None
See application file for complete search history.

(56) References Cited

U.S. PATENT DOCUMENTS

| | | | |
|---|---|---|---|
| 4,304,701 A | 12/1981 | Das et al. | |
| 5,618,586 A | 4/1997 | Swarup et al. | |
| 5,645,926 A * | 7/1997 | Horrocks | A41D 31/0022 428/920 |
| 6,218,074 B1 * | 4/2001 | Dueber | G03F 7/033 430/273.1 |
| 2003/0088045 A1 * | 5/2003 | Haberle | C04B 24/282 528/44 |
| 2004/0132910 A1 * | 7/2004 | Magnet | C09D 5/185 525/191 |
| 2006/0264562 A1 * | 11/2006 | Duquesne | C09D 5/185 524/515 |
| 2011/0136937 A1 * | 6/2011 | Wierzbicki | C09K 21/02 523/179 |
| 2012/0121921 A1 * | 5/2012 | Cosyns | C04B 24/2641 428/522 |
| 2014/0005298 A1 * | 1/2014 | Thewes | C09D 5/185 523/179 |
| 2015/0291810 A1 * | 10/2015 | Peskens | C09D 5/185 428/463 |
| 2015/0361301 A1 * | 12/2015 | Egan | C09D 133/08 524/35 |

FOREIGN PATENT DOCUMENTS

| | | |
|---|---|---|
| EP | 0860742 A1 | 8/1998 |
| JP | 2004012810 A | 1/2004 |
| WO | 199107473 | 5/1991 |
| WO | WO 01/60883 A1 | 8/2001 |
| WO | WO 2011/009874 A1 | 1/2011 |
| WO | 2014111292 | 7/2014 |

* cited by examiner

*Primary Examiner* — Peter A Salamon
(74) *Attorney, Agent, or Firm* — Diane R. Meyers

(57) ABSTRACT

Self-crosslinkable binder compositions which include a copolymer obtained by reacting a mixture of monomers in the presence of an organic solvent, wherein the monomer mixture includes a carboxylic acid monomer, a polymerizable ethylenically unsaturated monomer, and a crosslinkable acrylamide monomer. Intumescent coatings containing the self-crosslinkable binder, and substrates coated with the intumescent coatings are also disclosed.

9 Claims, No Drawings

CROSSLINKABLE BINDERS FOR SOLVENT BASED INTUMESCENT COATINGS

FIELD OF THE INVENTION

The present invention pertains generally to self-crosslinkable film-forming compositions, and to use of such compositions in solvent based intumescent coatings.

BACKGROUND OF THE INVENTION

Intumescent coating compositions may be applied on substrates, such as metal, wood, and other materials, in the manner of a coating having relatively low film thickness. Upon exposure to fire, heat or flames, the intumescent coating expands considerably in terms of thickness to produce an insulative layer of char and char foam.

That is, upon heating, the intumescent coating will produce gases and decompose to form a cellular carbonaceous char which is then expanded into foam by release of the produced gases. The foamed insulating layer of carbon protects the underlying substrate by reducing the rate of heating and hence prolongs the time for the substrate to reach critical failure temperatures. Thus, intumescent coatings are typically applied to substrates used in the construction industry to provide structures and buildings with improved fire resistance.

Not only do intumescent coatings provide fire retardancy, but they also provide performance characteristics generally expected of a conventional coating, such as fast dry times, good durability, and low cost. Incorporating both fire retardance and good coating properties in one system is not straightforward. It would, therefore, be desirable to provide improved binder compositions which may be useful in intumescent coatings, and intumescent coatings comprising these binders which demonstrate both intumescent characteristics and coating properties.

SUMMARY

The present invention is directed to a self-crosslinkable binder composition for an intumescent coating, the binder composition comprising a copolymer obtained by reacting a monomer mixture in the presence of an organic solvent, the monomer mixture comprising (i) 0.5 to 10 percent by weight of a polymerizable ethylenically unsaturated carboxylic acid monomer; (ii) 50 to 90 percent by weight of a polymerizable ethylenically unsaturated monomer different than (i); and (iii) 7 to 50 percent by weight of a crosslinkable acrylamide monomer, wherein the percent by weight is based on the total weight of the monomer mixture. The binder composition has an acid value of less than 100 mg KOH/g and the resulting copolymer has a weight average molecular weight of greater than 20,000.

The present invention is also directed to solvent based intumescent coatings containing these self-crosslinkable binder compositions and substrates coated with the intumescent coatings.

DETAILED DESCRIPTION

The present invention provides self-crosslinkable film-forming compositions useful as binder compositions in intumescent coatings, solvent based intumescent coatings comprising the binder composition compositions, and substrates coated with the intumescent coatings.

Throughout this description and in the appended claims, use of the singular includes the plural and plural encompasses singular, unless specifically stated otherwise. For example, although reference is made herein to "a" polymerizable ethylenically unsaturated carboxylic acid monomer, "a" polymerizable ethylenically unsaturated monomer, "a" crosslinkable acrylamide monomer, "a" chain transfer agent, "a" free radical initiator, "an" organic solvent, "an" acid source, "a" carbon source, and "a" gas source, one or more of any of these components and/or any other components described herein can be used.

The word "comprising" and forms of the word "comprising", as used in this description and in the claims, does not limit the present invention to exclude any variants or additions. Additionally, although the present invention has been described in terms of "comprising", the processes, materials, and coating compositions detailed herein may also be described as "consisting essentially of" or "consisting of". For example, while certain aspects of the invention have been described in terms of self-crosslinkable binder compositions comprising a copolymer obtained by reacting a mixture comprising a polymerizable ethylenically unsaturated carboxylic acid monomer, a polymerizable ethylenically unsaturated monomer, and a crosslinkable acrylamide monomer, in the presence of an organic solvent, a chain transfer agent, and an initiator, a mixture "consisting essentially of" or "consisting of" these components is also within the present scope. In this context, "consisting essentially of" means that any additional components will not materially affect the molecular weight, acid value, and/or glass transition temperature of the self-crosslinkable binder compositions, or will not materially affect the intumescent characteristics or shore A hardness of an intumescent coating comprising the self-crosslinkable binder compositions.

Furthermore, the use of "or" means "and/or" unless specifically stated otherwise. As used herein, the term "polymer" refers to prepolymers, oligomers and both homopolymers and copolymers, and the prefix "poly" refers to two or more. "Including" and like terms means including, but not limited to. When ranges are given, any endpoints of those ranges and/or numbers within those ranges can be combined within the scope of the present invention.

The term "cure", "cured" or similar terms, as used in connection with a cured or curable composition, e.g., a "cured composition" or "cured coating" of some specific description, means that at least a portion of the film-forming copolymer or "binder composition" that form the coating are polymerized and/or crosslinked, or are dried to form a hardened film. Curing or drying reactions to form the hardened film may be carried out under ambient conditions. By "ambient conditions" is meant the condition of surroundings without adjustment of the temperature, humidity or pressure. Usually ambient temperature ranges from 60 to 90° F. (15.6 to 32.2° C.), such as a typical room temperature, 72° F. (22.2° C.). Once cured or dried, a film-forming resin is stable on exposure to solvents and to moderate heat.

As used herein and in the claims, the term "linear" refers to hydrocarbon and/or polymer chains that are substantially in a straight line. As used herein and in the claims, the term "branched" refers to hydrocarbon and/or polymer chains that contain side chains connected or otherwise covalently bonded to the main chain. As used herein and in the claims, the term "self-crosslinkable" refers to crosslinking within the copolymer that does not depend on the presence of other monomers.

Other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and appended claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Unless otherwise indicated, molecular weights are reported as weight average molecular weights determined by gel permeation chromatography relative to polystyrene standards with the unit of g/mol.

Acrylic and methacrylic are designated herein in a summarizing manner as (meth)acrylic. Likewise, allyl and methallyl are designated herein in a summarizing manner as (meth)allyl.

The present invention provides a self-crosslinkable binder composition for a solvent based intumescent coating, wherein the binder composition comprises a copolymer obtained by reacting a monomer mixture in the presence of an organic solvent. The monomer mixture comprises (i) a polymerizable ethylenically unsaturated carboxylic acid monomer, (ii) a polymerizable ethylenically unsaturated monomer, and (iii) a crosslinkable acrylamide monomer.

The polymerizable ethylenically unsaturated carboxylic acid monomer (i) may comprise one or more α,β-monoethylenically unsaturated mono- and dicarboxylic acids (e.g., acrylic acid, methacrylic acid, itaconic acid, maleic acid, fumaric acid, crotonic acid, dimethacrylic acid, ethylacrylic acid, allylacetic acid, vinylacetic acid, mesaconic acid, methylenemalonic acid, or citraconic acid, or mixtures of two or more of these monomers). In some examples, the polymerizable ethylenically unsaturated carboxylic acid monomers useful for preparing the copolymer are selected from the group consisting of (meth)acrylic acid, itaconic acid, maleic acid, fumaric acid, and mixtures thereof.

The self-crosslinkable binder composition may comprise 0.5 to 10 percent by weight of the polymerizable ethylenically unsaturated carboxylic acid monomer (i), such as 2 to 9 percent by weight or 3 to 8 percent by weight, based on the total weight of the monomer mixture. According to certain aspects of the present invention, the acid number of the self-crosslinkable binder composition may be less than 100 mg KOH/g, such as less than 50 mg KOH/g, or even less than 20 mg KOH/g. As such, the self-crosslinkable binder composition of the present invention may not need to be neutralized prior to use in a coating such as, for example, an intumescent coating.

The polymerizable ethylenically unsaturated monomer (ii) may comprise vinyl aromatics such as such as styrene, alpha-methyl styrene, vinyl toluene, and t-butyl styrene; ethylenically unsaturated aliphatic monomers such as ethylene, propylene, and 1,3-butadiene; alkyl, aralkyl, cycloaliphatic, heterocyclic, or aromatic esters of (meth)acrylic acid having from 1 to 17 carbon atoms in the alkyl group, with from 4 to 12 carbon atoms in any cycloaliphatic group and 6 to 12 carbon atoms in any aromatic group (it is understood that the alkyl, aralkyl, cycloaliphatic, heterocyclic and aromatic moieties may be substituted by heteroatom-containing groups such as hydroxyl and acetoxy groups), examples including methyl (meth)acrylate, ethyl (meth)acrylate, butyl (meth)acrylate, tert-butyl (meth)acrylate, cyclohexyl (meth)acrylate, 2-ethylhexyl (meth)acrylate, tetrahydrofurfuryl acrylate, 2-tetrahydropyranyl acrylate, benzyl-(meth)acrylate, phenyl (meth)acrylate, 4-acetoxyphenethyl acrylate, 2-(4-benzoyl-3-hydroxyphenoxy)ethyl acrylate, benzyl 2-propylacrylate, isobornyl (meth)acrylate and lauryl (meth)acrylate; and acryloyl containing monomers such as acryloyl chloride and acryloylmorpholine.

The polymerizable ethylenically unsaturated monomer (ii) present, in the monomer mixture may comprise styrene, substituted styrenes, and alkyl, cycloalkyl, or aromatic esters of (meth)acrylic acid having from 4 to 12 carbon atoms, typically 6 to 12 carbon atoms, in the alkyl, cycloalkyl, or aromatic group such as butyl (meth)acrylate, cyclohexyl (meth)acrylate, phenyl (meth)acrylate, and any mixture thereof.

The self-crosslinkable binder composition may comprise 50 to 90 percent by weight of the polymerizable ethylenically unsaturated monomer (ii), such as 60 to 80 percent by weight, based on the total weight of the monomer mixture.

Suitable crosslinkable acrylamide monomers (iii) include but are not limited to N-methylolacrylamide, N-methylolmethacrylamide, N-(alkoxymethyl)acrylamides or N-(alkoxymethyl)methacrylamides with a $C_1$- to $C_6$-alkyl radical, such as N-(isobutoxymethyl) acrylamide (IBMA), N-(isobutoxymethyl) methacrylamide (IBMMA), N-(n-butoxy-methyl)-acrylamide (NBMA) and N-(n-butoxymethyl)-methacrylamide (NBMMA), N-phenylacrylamide, N-(3-methoxypropyl) acrylamide, N-isopropylmethacrylamide, N-isopropylacrylamide, 2-hydroxypropyl methacrylamide, N-(hydroxymethyl)acrylamide, N-hydroxyethyl acrylamide, N-ethylacrylamide, N-[3-(dimethylamino)propyl] methacrylamide, and the like.

The self-crosslinkable binder composition may comprise 7 to 50 percent by weight of the crosslinkable acrylamide monomers (iii), such as 10 to 35 percent by weight or 12 to 30 percent by weight, based on the total weight of the monomer mixture. Amounts which are too low, such as less than 7 percent by weight of the self-crosslinkable binder composition, may not provide coatings with sufficient mar resistance or hardness, while coatings comprising more than 50 percent by weight of the self-crosslinkable binder composition may gel during curing and may not provide sufficient chemical resistance or expansion on heating when included in an intumescent coating. The term "gel" may be taken to mean that the binder composition has an intrinsic viscosity which is too high to allow measurement of the molecular weight of the copolymer by gel permeation chromatography (i.e., an essentially infinite molecular weight).

The self-crosslinkable binder composition may comprise a copolymer obtained by reacting a monomer mixture comprising (i) 0.5 to 10 percent by weight of a polymerizable ethylenically unsaturated carboxylic acid monomer, (ii) 50 to 90 percent by weight of a polymerizable ethylenically unsaturated monomer different than (i), and (iii) 7 to 50 percent by weight of a crosslinkable acrylamide monomer, each based on the total weight of the monomers in the monomer mixture.

The copolymer of the self-crosslinkable binder composition described above can be prepared by free radical initiated addition polymerization of the monomer mixture, such as by organic solution polymerization techniques. The monomers are typically dissolved in an organic solvent or mixture of solvents including ketones such as methyl ethyl ketone; esters such as ethyl acetate, butyl acetate, the acetate of propylene glycol, and hexyl acetate; alcohols such as ethanol and butanol; ethers such as propylene glycol monopropyl ether and ethyl-3-ethoxypropionate; and hydrocarbon solvents including aromatic solvents such as xylene and AROMATIC 100 or SOLVESSO 100, a mixture of high boiling hydrocarbon solvents available from Exxon Chemical Co. One or more of the monomers of the monomer mixture may be at least partially soluble in the solvent.

In an exemplary organic solution polymerization process, the solvent is charged to a flask equipped with a thermometer, agitator, condenser and dropping funnel. The dropping funnel is charged with the monomer mixture, a chain transfer agent, and one or more initiators. The organic solvent is first heated to reflux, usually between 110° C. to 160° C., and the monomer mixture including the chain transfer agent and initiator is slowly added to the refluxing solvent, over a period of about 1 to 5 hours. Adding the monomers too quickly may cause poor conversion or a high and rapid exotherm, which is a safety hazard. Adding the monomers too slowly, such as over a period greater than 5 hours, may yield a copolymer with an undesirably high molecular weight.

Additional charges of the initiator may be added over the course of several hours while maintaining reflux temperature. After addition is completed, the contents of the flask may be held at reflux temperature for several additional hours to ensure conversion of monomers to copolymer. The product may then be cooled and diluted to a desired solids content using additional solvent.

As described, the monomer mixture may be reacted in the presence of a chain transfer agent and one or more initiators. Chain transfer agents are compounds which are generally used in the manufacture of acrylic addition polymers to control their molecular weight. Such substances are added to the monomer mixture during polymerization and can be considered part of the total amount of monomers used in forming the addition polymers. The chain transfer agent of the present invention may comprise mercaptans, ketones, and chlorohydrocarbons.

Exemplary chain transfer agents include alkyl mercaptans which are soluble in the monomer mixture, such as octyl mercaptan, dodecyl mercaptan, pentaerythritol tetra(3-mercaptopropionate), tertiary-dodecyl mercaptan; and ketones such as methyl ethyl ketone. According to certain aspect of the present invention, the chain transfer agent may be tertiary-dodecyl mercaptan, as it results in a high conversion of monomer to polymeric product. The chain transfer agent may be included in the present invention at up to 5 percent by weight, such as between 0.1 and 5 percent by weight, or even between 0.1 and 1 percent by weight, based on the total weight of all components employed to prepare the copolymer.

The initiator of the present invention typically includes a thermal free radical initiator and optionally one or more solvents, such as those described above for use in the self-crosslinkable binder composition. Suitable thermal free radical initiators include, but are not limited to, peroxide compounds, azo compounds, persulfate compounds, and mixtures thereof.

Examplary peroxide compounds include at least hydrogen peroxide, methyl ethyl ketone peroxides, benzoyl peroxides, ditertbutyl peroxides, ditertamyl peroxides, dicumyl peroxides, diacyl peroxides, decanoyl peroxide, lauroyl peroxide, peroxydicarbonates, peroxyesters, dialkyl peroxides, hydroperoxides, and peroxyketals.

Exemplary azo compounds include at least 4-4'-azobis(4-cyanovaleric acid), 1-1'-azobiscyclohexanecarbonitrile, 2-2'-azobisisobutyronitrile, 2-2'-azobis(2-methylpropionamidine) dihydrochloride, 2-2'-azobis(2-methylbutyronitrile), 2-2'-azobis(propionitrile), 2-2'-azobis(2,4-dimethylvaleronitrile), 2-2'-azobis(valeronitrile), 2,2'-azobis[2-methyl-N-(2-hydroxyethyl) propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N,N'-dimethylene-isobutyramidine)dihydrochloride and 2-(carbamoylazo)-isobutyronitrile.

While certain exemplary initiator compounds have been listed, any suitable compound that can initiate polymerization for the monomers of the monomer mixture disclosed herein may be used in the invention. The initiator is typically present in the reaction mixture at about 0.5 to 8 percent by weight, such as 0.5 to 5 percent by weight, based on total weight of all components employed to prepare the copolymer.

Thus, the self-crosslinkable binder composition comprises a copolymer obtained by reacting a monomer mixture (I) comprising: (i) a polymerizable ethylenically unsaturated carboxylic acid monomer, (ii) a polymerizable ethylenically unsaturated monomer, and (iii) a crosslinkable acrylamide monomer, in the presence of (II) a chain transfer agent, (III) a free radical initiator, and (IV) an organic solvent.

As used herein and in the claims, the term "binder composition" refers to a composition comprising at least one film-forming component, such as a polymer or copolymer. As used herein and in the claims, the term "copolymer" refers to polymers that are the reaction product of two or more reactants, such as two or more different monomers. Thus, in the present invention, the self-crosslinkable binder composition generally comprises the copolymer which is the reaction product of the monomer mixture (I) listed above, reacted in the presence of the chain transfer agent (II), the free radical initiator (III), and the organic solvent (IV), and additionally, any unreacted monomers, chain transfer agent, free radical initiator, and organic solvent.

The polymerizable ethylenically unsaturated carboxylic acid monomer (I)(i) is typically included in amounts of from 0.5 to 10 percent by weight, such as from 0.5 to 5 percent by weight, based on the total weight of all components employed to prepare the copolymer. The polymerizable ethylenically unsaturated monomer (I)(ii) is typically included in amounts from 20 to 80 percent by weight, such as from 20 to 60 percent by weight, based on the total weight of all components employed to prepare the copolymer. The crosslinkable acrylamide monomer (I)(iii) is typically included in amounts of from 5 to 50 percent by weight, such as from 5 to 30 percent by weight, based on the total weight of all components employed to prepare the copolymer. The chain transfer agent (II) is typically included in amounts of from 0.1 to 5 percent by weight, such as 0.1 to 1 percent by weight, based on the total weight of all components employed to prepare the copolymer. The free radical initiator (III) is typically included in amount of from 0.5 to 8 percent by weight, such as from 0.5 to 5 percent by weight, based on the total weight of all components employed to prepare the copolymer. The solvent may be included in amounts of up to 70 percent by weight, such as up to 50 percent by weight, based on the total weight of all components employed to prepare the copolymer. The total percent by weight for all of the components employed to prepare the copolymer of the self-crosslinkable binder composition (i.e., (I)(i), (I)(ii), (I)(iii), (II), (III), and (IV) combined) will in most cases add to 100 percent.

The copolymer of the self-crosslinkable binder composition of the present invention may alternatively be prepared in a pressurized tank by a continuous polymerization process, such as that described in U.S. Pat. No. 7,323,529, incorporated herein by reference in its entirety.

The conversion (i.e., the chemical transformation of monomers to copolymers) can vary based on the process parameters employed and the characteristics desired (molecular weight, copolymer composition, and the like). In many cases, unreacted monomers can be removed later in the process. The conversion can be, for example, at least 50%, in some cases at least 55%, in other cases at least 60%, in some situations at least 65%, and in other situations at least 75% calculated as the weight percent of copolymer based on the total weight of monomers employed. Also, the conversion can be up to 100%, in some cases up to 99.9%, in other cases up to 99%, in some situations up to 96%, in other situations up to 95%, and in particular situations up to 90% calculated as the weight percent of copolymer based on the total weight of monomers employed. The conversion can be any value or range between any set of values recited above.

The copolymer of the self-crosslinkable binder composition of the present invention typically has a weight average molecular weight ($M_w$) of at least 20,000, and in some cases at least 30,000. The copolymer may have a $M_w$ of up to 500,000, typically up to 100,000, and in some cases up to 50,000. The $M_w$ of the copolymer is selected based on the properties that are to be incorporated into the copolymer, self-crosslinkable binder composition comprising the copolymer, and/or intumescent coating composition comprising the self-crosslinkable binder composition. The $M_w$ of the copolymer may vary in any range of values inclusive of those stated above.

After polymerization, the self-crosslinkable binder composition often has a solids content of over 30 percent by weight, such as over 50 percent by weight, based on the total weight of the copolymer and organic solvents in the self-crosslinkable binder composition. Excess solvents may be removed from the reaction mixture under reduced pressure to yield a product with a solids content such as, for example, at least 50 percent by weight solids. Alternately, the self-crosslinkable binder composition may be mixed with a solvent, such as any of those disclosed herein, to a final solids content of 30 percent by weight or greater, such as 50 percent by weight, based on the total weight of the self-crosslinkable binder composition.

The copolymers prepared by the techniques described above may be used in solvent based film-forming compositions; that is, film-forming compositions containing less than about 5% by weight water, based on total weight of the film-forming composition.

The monomer mixture described herein, upon polymerization, may form a copolymer having a relatively high degree of branching. That is, the inventive copolymers of the present invention may exhibit an alpha parameter derived from the Mark-Houwink equation of less than 0.50, such as between 0.4 and 0.5. The Mark-Houwink relationship between molar mass (M) and intrinsic viscosity (η) is described by EQ. 1:

$$[\eta] = K \cdot M^a \qquad \text{EQ. 1}$$

where K and a (alpha parameter) are empirically determined constants which provide information about the structure of the polymer. The alpha parameter indicates the degree of branching and can be determined as described by Paillet et al., Journal of Polymer Science Part A: Polymer Chemistry, 2012, 50, 2967-2979, incorporated by reference herein. Random linear coil polymers typically have an alpha parameter of between 0.5 and 0.8, while highly branched polymers have an alpha parameter of less than 0.5.

The monomer mixture described herein, upon polymerization, may form a copolymer that is linear or non-branched. That is, the inventive copolymers of the present invention may exhibit an alpha parameter derived from the Mark-Houwink equation of greater than 0.5. The source (i.e., purity level) and/or selection of the crosslinkable acrylamide monomer (iii) may drive the degree of crosslinking, wherein selection of a very pure mono-functional crosslinkable acrylamide monomer (iii) may lead to a linear copolymer.

The present invention also provides an intumescent coating composition comprising the self-crosslinkable binder composition described herein, an acid source, a carbon source, and a gas source. Under the influence of heat, typically between 100° C. and 200° C., the self-crosslinkable binder composition and certain other components of the intumescent coating may melt and begin to flow. As the temperature increases (>200° C.), the acid source, usually by decomposition, produces copious amounts of acid which can react with other constituents in the coating. If the acid source is a polyphosphate, polyphosphoric acids are released which can react with the carbon source, for example a polyhydric alcohol, to form polyphosphoric acid esters. The decomposition of these esters leads to the formation of carbon compounds, which together with the gas source such as, for example a blowing agent, give rise to a carbon foam or char.

When a coating comprising a copolymer (binder composition) heats and begins to burn, the "slumping" (dripping) of the flaming copolymer can promote progression of the fire. The formation of a stable foam or char layer after combustion of a section of the coating, as described above, may protect the underlying structure as it creates a barrier to further ignition, and reduces the rate of heating of the underlying structure. As such, a binder composition that may not melt or slump would improve char formation, thus improving the intumescent characteristics of the coating and further protecting the underlying structure.

The self-crosslinkable binder composition of the present invention is observed to have improved intumescent characteristics during fire performance tests (see Table 3 in the Examples section below). Specifically, char slumping is significantly improved for the self-crosslinkable binder composition comprising all three monomer components. The comparative data in Table 3 shows that the combined effect of the three monomers: (i) a polymerizable ethylenically unsaturated carboxylic acid monomer, (ii) a polymerizable ethylenically unsaturated monomer, and (iii) a crosslinkable acrylamide monomer, gives the most desirable properties. Only when all three monomers are present does the coating develop good fire performance, hardness, moisture resistance and char properties.

Without wishing to be bound by a specific theory, the present invention is believed to involve additional crosslinking reactions of the crosslinkable acrylamide with itself (self-crosslinking) upon exposure to heat, such as during a fire event. In addition, the release of acid from the acid source of the coating during the heating process may further catalyze self-crosslinking reactions of the crosslinkable acrylamide. This additional crosslinking may result in an increased viscosity that reduces the char slumping and increases the char density during a fire test (as reported in Table 3). Reduced slumping may provide additional time for the gases produced on heating (i.e., gases produced by thermal decomposition of the gas source) to foam the coating and produce a stable char.

The intumescent coating compositions of the present invention contain an acid source, examples of which include phytate derivatives, ammonium polyphosphate, melamine phosphate, magnesium sulphate, ammonium pentaborate, zinc borate, and boric acid. The acid source is typically included in the intumescent coating at from 5 to 40 percent by weight, such as 10 to 35 percent by weight, or 20 to 30 percent by weight, based on the total weight of the intumescent coating composition.

Particularly suitable as an acid source is ammonium polyphosphate, often abbreviated "APP", because it has a high phosphorus content and because it yields phosphoric acid at temperatures below the decomposition temperatures of the carbon and gas sources described below, and yet above the normal temperatures used for processing the intumescent composition. The ammonium polyphosphates are polymeric phosphates, having P—O—P linkages, which may be represented by the formula: $H_{n-m+2}(NH_4)_m P_n O_{3m+1}$, wherein the average value of n is at least about 10, the average value of m is a number up to n+2, and the ratio m/n is in the range of from about 0.7 to about 1.2. The values of n and m for any particular compound will be positive integers, while the average values of n and m for a mixture of compounds constituting the ammonium polyphosphate may each individually be a positive integer or a positive number which is not an integer. Particularly useful ammonium polyphosphates in the intumescent coating compositions of the present invention include those having values of n>1000.

The intumescent coating compositions of the present invention contain a carbon source which can be a liquid carbon source, a solid carbon source, or a combination thereof. Exemplary carbon sources include organic polyhydroxy-functional compounds, such as the solid carbon sources pentaerythritol, dipentaerythritol, and tripentaerythritol. Starch, sugars such as glycerin, and expandable graphite are other exemplary carbon sources. The carbon source is typically included in the intumescent coating composition from 0.1 to 20 percent by weight, such as 3 to 15 percent by weight, or even 8 to 12 percent by weight, based on the total weight of the intumescent coating composition.

The intumescent coating compositions of the present invention contain a compound capable of releasing gas upon exposure to heat. Suitable gas sources are those which decompose, or are activated, above 200° C., for example in the range 280 to 390° C. Suitable gas sources are generally nitrogen containing compounds such as melamine, melamine salts, melamine derivatives, urea, dicyandiamide, guanidine, and cyanurates. Specific additional examples include glycine, melamine phosphate, melamine borate, melamine formaldehyde, melamine cyanurate, tris-(hydroxyethyl) isocyanurate (THEIC), or chlorinated paraffin. The gas source is typically included in the intumescent coating at from 3 to 20 percent by weight, such as 3 to 15 percent by weight, or even 8 to 12 percent by weight, based on the total weight of the intumescent coating composition.

The intumescent coating composition may further comprise a pigment and/or a solvent which is separate from any solvent provided by the self-crosslinkable binder composition. A pigment such as, for example, titanium dioxide, is typically included in the intumescent coating at from 3 to 20 percent by weight, such as 5 to 15 percent by weight, or even 6 to 10 percent by weight, based on the total weight of the intumescent coating composition.

The solvent may be an organic solvent. Exemplary organic solvents include aromatic solvents such as toluene, xylene, ketones (acetone, MIBK, MAK, etc.), ethyl acetate and butyl acetate, high boiling aromatic solvents and aromatic solvent blends derived from petroleum such as those available from Exxon Mobil Corporation as AROMATIC 100 or SOLVESSO 100. The solvent, which is separate from any solvent provided by the self-crosslinkable binder composition, may be included in the intumescent coating at from 2 to 40 percent by weight, such as 5 to 25 percent by weight, or even 10 to 20 percent by weight, based on the total weight of the intumescent coating composition.

Certain optional components may additionally be included, such as an inorganic nucleating agent, an inorganic filler, a rheology modifier, a flame retardant, a char reinforcer, and/or a liquid carrier.

Although not an essential ingredient in intumescent reactions, inorganic "nucleating" agents are often included since they provide sites for the intumescent char to form, and improve the thermal resistance properties and stability of the intumescent char during a fire. Thus, the intumescent coating compositions of the present invention may contain a nucleating agent, examples of which include certain pigments, such as titanium dioxide, zinc oxide, aluminium oxide, micaceous iron oxide, carbon black, and other inorganic compounds including silica, silicates, heavy metal oxides such as cerium oxide, lanthanum oxide and zirconium oxide, calcium carbonite, talcum, wollastonite, china clay, mica and bentonite clay. A nucleating agent such as titanium dioxide, which is also a pigment, may also provide opacity and/or color to the coating. The nucleating agent is typically included in the intumescent coating at from 3 to 20 percent by weight, such as 5 to 15 percent by weight, or even 6 to 10 percent by weight, based on the total weight of the intumescent coating composition.

Further additives may be optionally included as part of the intumescent ingredients to aid char formation and to strengthen the char and prevent char degradation. Such additives include solids such as zinc borate, zinc stannate, zinc hydroxystannate, glass flake, glass spheres, polymeric spheres, fibers (ceramic, mineral, glass/silica based), aluminium hydroxide, antimony oxide, boron phosphate, fumed silica. Particularly suitable fibers include engineered mineral fibers that are 100 to 500 microns in length. Such additives may be included in the intumescent coating at from 1 to 5 percent by weight, based on the total weight of the intumescent coating composition.

Further, rheology modifiers, such as a thixotrope may be included in the intumescent coating composition. Suitable thixotropic additives include organically modified inorganic clays such as bentonite clays, hectorite clays or attapulgite clays, organic wax thixotropes based on castor oil and castor oil derivatives, and fumed silica.

To improve or facilitate dispersion of the intumescent ingredients and also to reduce the overall viscosity of the intumescent coating, it may be desired to incorporate wetting/dispersion additives. Such additives are usually liquid in form and can be supplied either containing a solvent or can be solvent free.

The self-crosslinkable binder composition of the present invention may also provide improved dispersion of the pigment and various other components of the intumescent coating disclosed herein. That is, certain of the unreacted monomers such as, for example, the polymerizable ethylenically unsaturated carboxylic acid monomer or the crosslinkable acrylamide monomer, may assist in dispersing the pigments (e.g., titanium dioxide). The polymerizable ethylenically unsaturated carboxylic acid monomer may also release gases such as carbon dioxide on heating, thus providing additional gas for the foaming process.

The intumescent compositions of the present invention may further comprise a halogenated polymeric resin as a flame retardant and/or char expansion agent. A particularly suitable flame retardant includes chlorinated paraffin, which may be included in the composition at from 0 to 15 percent by weight, such as 2 to 12 percent by weight, based on the total weight of the intumescent coating composition.

Furthermore, the pigment volume concentration (PVC) may be 30 to 80 percent, such as from 50 to 75 percent, or even 55 to 70 percent. "PVC", as used herein, is equal to the volume of pigment compared to the total volume of all solids in the coating composition.

The present invention is further drawn to substrates at least partially coated with an intumescent coating composition as described herein. Substrates to which these compositions may be applied include rigid metal substrates, such as ferrous metals, aluminum, aluminum alloys, copper, and other metals or alloys. Exemplary ferrous metal substrates useful in the practice of the present invention include iron, steel, and alloys thereof.

Steel sections requiring fire protection are normally blast cleaned prior to the application of an intumescent coating to remove millscale and other deposits that may lead to premature failure of the intumescent coating, either on prolonged atmospheric exposure or during a fire situation. In order to prevent deterioration of the blast cleaned surface, particularly where there is a delay in applying the intumescent coating, it is normal practice to apply a primer coating: This is often the case when the intumescent coating is applied on site.

Examples of suitable primers are coatings based on epoxy, modified epoxy (such as modified with polyvinyl butyral), polyurethane, acrylic, vinyl and chlorinated rubber. The thickness of the primer may be in the range from 15 microns to 250 microns, such as in the range from 25 microns to 100 microns.

A topcoat may be applied to the cured intumescent coatings of the present invention, particularly to provide color to exposed steelwork. A topcoat may enhance the durability of the intumescent coating compositions. A clear sealer may also be suitable. Examples of suitable topcoats are coatings based on epoxy, polyurethane, alkyd, acrylic, vinyl or chlorinated rubber. The thickness of the topcoat can vary from 15 microns to 250 microns, such as from 25 microns to 75 microns, as too high a thickness of topcoat may inhibit the intumescent reactions.

EXAMPLES

The following examples are intended to illustrate the invention, and should not be construed as limiting the invention in any way. Percentages of components are by weight unless otherwise indicated.

Example A

A self-crosslinkable binder composition according to the present invention (binder A) was prepared using the ingredients and amounts listed in Table 1.

TABLE 1

| | INGREDIENTS | Ingredient Function | Parts by Weight (grams) | | |
|---|---|---|---|---|---|
| | | | Binder A | Binder B* | Binder C* |
| Charge 1 | Xylene | Organic solvent | 28.90 | 28.90 | 28.90 |
| Charge 2 | Methacrylic acid | (I) Monomers (i) Carboxylic acid monomer | 2.43 | — | 2.43 |
| | Styrene | (ii) Polymerizable ethylenically unsaturated monomer | 36.47 | 36.47 | 36.47 |
| | nBMA | (iii) Crosslinkable acrylamide monomer | 16.91 | 16.91 | — |
| | Tertiary dodecyl mercaptan | (II) Chain transfer agent | 0.54 | 0.54 | 0.54 |
| | Xylene | solvent | 0.72 | 0.72 | 0.72 |
| Charge 2a | | 8.2% Charge 2 added to start or seed the reaction | | | |
| Charge 3 | Xylene | solvent | 5.89 | 5.89 | 5.89 |
| | t-butyl peroxyacetate | (III) Free radical initiator | 1.50 | 1.50 | 1.50 |
| Charge 3a | | 8.6% Charge 3 added to start or seed the reaction | | | |
| Charge 4 | Xylene | solvent | 1.88 | 1.88 | 1.88 |
| | t-butyl peroxyacetate | (III) Free radical initiator | 0.33 | 0.33 | 0.33 |
| Charge 5 | Xylene | solvent | 1.88 | 1.88 | 1.88 |
| | t-butyl peroxyacetate | (III) Free radical initiator | 0.33 | 0.33 | 0.33 |
| Charge 6 | Xylene | solvent | 1.88 | 1.88 | 1.88 |
| | t-butyl peroxyacetate | (III) Free radical initiator | 0.33 | 0.33 | 0.33 | nBMA—n-butoxymethyl acrylamide (57.5% solution) sourced from Dorf Ketal Chemicals;
t-butyl peroxyacetate - 50% solution and Tertiary dodecyl mercaptan were sourced from Arkema Inc;
Xylene and Styrene were sourced from Shell Chemical;
Methacrylic acid sourced from Evonik Ind.
*Comparative Examples Charge 1 was added to a 1-liter, four-neck round bottom glass flask equipped with a motor driven stainless steel stir blade, a water-cooled condenser, a nitrogen inlet, and a heating mantle with a thermometer connected through a temperature feedback control device. The content of the flask was refluxed at 140° C. under nitrogen. The charge 2a and 3a were added to the flask at an equal rate over 5 minutes and held until reflux temperatures are established. These charges represent a percentage of charges 2 and 3 (charge 2a is 8.2% of charge 2, and charge 3a is 8.6% of charge 3) which are added to start or seed the reaction. The remaining amount of Charge 2 and 3 were fed to the flask over four hours, and then Charge 4 was added over 3 hours under reflux conditions. Charges 5 and 6 were added over 30 minutes each with a 30 minute hold in between. After all the charges were complete, the flask was held for an additional 1.5 hours at reflux temperatures and then the heat was turned off. The entire content was cooled to <40° C., poured out and a sample was placed in a 120° F. (49° C.) hot room for four weeks, and the sample remained liquid.

The resin had weight average molecular weight, $M_w$=37807 (determined by gel permeation chromatography using polystyrene as a standard), an acid value of 14.7 (ASTM D1639), a gardner bubble viscosity Z according to ASTM-D1725 (corresponding to ~22.7 poise), and 52% solids (110° C./1 h solids according to ASTM-2369).

Comparative binder compositions B and C were formulated as described above except that binder composition B lacks monomer (i), the polymerizable ethylenically unsaturated carboxylic acid monomer, and binder composition C lacks monomer (iii), the crosslinkable acrylamide monomer.

Example B

The binder composition A (acrylic resin binder) from Example A was used to prepare an intumescent coating (inventive coating 1; Table 2), which is compared to comparative coatings 2 and 3 formulated with binder compositions B and C, respectively (Table 3).

The coating formulations were prepared with a Dispermat-type dissolver equipped with a heavy duty stainless steel dispersion impeller. The binder compositions were used as grind vehicle for the solid materials. The solid materials were slowly added at low peripheral speed to maintain temperature<30° C. After all solids were added, a homogeneous dispersion was obtained by high speed mixing to 45° C.

The coatings were stored for 24 hours at 20° C. prior to application. The coatings were applied on W6×16 mild steel H-shaped columns and 7×3×3/16 inch mild steel panels. Two coats of 500 microns dry film thickness each were applied with a 48 hour recoat interval at 20° C. The coating was applied with a SATAJET 1000B air assisted spray gun using a 2.0 mm nozzle at 3 bar inlet pressure. The samples were dried for 1 week at ambient conditions followed by 1 week at 40° C. Final film thickness of each coating was measured with an Elcometer 456. The H-columns were fire tested in accordance with EN13381-8. The test was stopped when a steel temperature of 620° C. was reached. The steel panels were exposed to 100% humidity condensation at 40° C. and a 45 degree angle for 48 hours. The panels were dried 24 hours before being burnt with a propane torch operating at 2 bar for 3 minutes.

TABLE 2

| INGREDIENTS | Ingredient Function | PARTS BY WEIGHT (g) | | |
|---|---|---|---|---|
| | | Coating 1 | Coating 2* | Coating 3* |
| A | Binder | 21.5 | — | — |
| B* | | — | 21.5 | — |
| C* | | — | — | 21.5 |
| Pentaerythritol | Carbon source | 7.6 | 7.6 | 7.6 |
| Ammonium Polyphosphate | Acid source | 25.4 | 25.4 | 25.4 |
| Melamine | Gas source | 7.6 | 7.6 | 7.6 |
| Xylene | Organic solvent | 17.7 | 17.7 | 17.7 |
| TiO$_2$ | Pigment | 6.4 | 6.4 | 6.4 |
| China Clay E | Inorganic filler | 4.0 | 4.0 | 4.0 |
| Chlorinated paraffin | Flame retardant | 8.5 | 8.5 | 8.5 |
| Fumed silica | Rheology modifier | 0.5 | 0.5 | 0.5 |
| Hydrogenated castor oil | Rheology modifier | 0.8 | 0.8 | 0.8 |

Binder A: a 52% styrene-methacrylic acid-nBMA binder solution in xylene according to the present invention;
Binder B: a 52% styrene-nBMA binder solution in xylene (comparative); and
Binder C: a 52% styrene-methacrylic acid binder solution in xylene (comparative).
*Comparative Examples The char expansion factor was determined by measuring the volume increase of the char on the steel at 8 points equally spread over the surface. Char cracking and slumping were visually inspected. The char was removed from the steel and cut to assess adhesion and density of the air pockets. All physical properties were rated on a scale of 1 to 5, 1 being the worst and 5 being the best.

The comparative data in Table 3 shows that binder compositions having the combined effect of the three monomers: (i) a polymerizable ethylenically unsaturated carboxylic acid monomer, (ii) a polymerizable ethylenically unsaturated monomer different from (i), and (iii) a crosslinkable acrylamide monomer, produce coatings having the most desirable properties. For example, the char slumping and char density is significantly improved for the self-crosslinkable binder composition comprising all three monomer components. Additional crosslinking reactions of the crosslinkable acrylamide with itself (self-crosslinking) upon exposure to heat, such as during a fire event, may lead to an increased viscosity that reduces the char slumping and increases the char density during a fire test. The reduced slumping may provide additional time for the gases produced on heating (i.e., gases produced by thermal decomposition of the gas source) to foam the coating and produce a stable char. Also evident in Table 3 is the increased time for the coated steel to reach the critical failure temperature of 620° C. (fire performance test). It took over 50 minutes for the inventive coating 1 to reach 620° C., while the comparative coating 3 (without the crosslinkable acrylamide monomer) was found to reach 620° C. at only 36 minutes. The comparative coating 3 (without the carboxylic acid monomer) showed a similar time to the critical temperature as the inventive coating, but had 100% expansion loss on exposure to humidity and showed poor results for char cracking, slumping, adhesion, and density.

TABLE 3

| | Coating 1 | Coating 2* | Coating 3* |
|---|---|---|---|
| Fire performance (minutes) Time for steel substrate to reach 620° C. according to EN13381-8 | 53 | 51 | 36 |
| Pigment Grind (microns) ASTM D1210 | 125 | 125 | 135 |
| Nail hardness after 48 hours ambient dry* | 3 | 1 | 5 |
| Expansion loss after 48 hours 100% humidity exposure at 40° C. | 40% | 100% | 35% |

TABLE 3-continued

|  | Coating 1 | Coating 2* | Coating 3* |
|---|---|---|---|
| Char Expansion Factor | 54 | 72 | 35 |
| Char Cracking* | 4 | 2 | 4 |
| Char Slumping* | 5 | 2 | 2 |
| Char Adhesion* | 4 | 3 | 4 |
| Char Density* | 4 | 2 | 3 |

*Scale 1-5, 1 being the worst; 5 being the best result

Example C

Binder composition samples comprising varied formulations of the monomer mixture (Binder compositions E, F, and G) were compared to a binder composition formulated without the crosslinkable acrylamide (Binder composition H) and a commercially available styrene acrylic binder composition (Binder composition D). Samples of each binder composition as listed in Table 4 were submitted for the GPC-triple detector (TD-GPC) method to determine the absolute molar mass distribution and branching. Chromatograms of the three detectors, multi-angle laser light scattering (MALS)/refractometer (RI)/viscometer (VIS), were overlaid and absolute Mw values were generated. The relationship between intrinsic viscosity or molecular size to the molecular weight of a polymer is expressed by the Mark-Houwink equation (EQ. 1). Branched polymers are generally smaller in size and are denser at any given molecular weight compared to linear polymers so the intrinsic viscosity will be lower. Thus, a declined slope of a Mark-Houwink plot correlates to a lower alpha parameter and an increased degree of branching. Even though the degree of polymer branching can be measured only when the same polymer with a linear structure is available or its Mark-Houwink parameters are known, the refractive index increment (dn/dc; Table 5) values are relatively close among the samples, which indicates that the chemical compositions are similar and a relative comparison can be made of their alpha parameters (Table 4).

TABLE 4

| | Percent by Weight (based on total monomers) | | | | |
|---|---|---|---|---|---|
| Binder | Monomer (i) | Monomer (ii) | Monomer (iii) | dn/dc (mL/g) | alpha parameter |
| Binder D* | — | — | — | 0.1380 | 0.690 |
| Binder E | 5 | 75 | 20 | 0.1662 | 0.433 |
| Binder F | 2 | 79 | 19 | 0.1663 | 0.451 |
| Binder G | 7.5 | 80 | 12.5 | 0.1718 | 0.462 |
| Binder H* | 10 | 90 | 0 | 0.1925 | 0.622 |

Binders E, F, and G: a 52% styrene-methacrylic acid-NBMA binder solution in xylene according to the present invention;
Binder D: Pliolite AC80 - a styrene acrylic binder commercially available from Omnova Solutions; and
Binder H: a 52% styrene-methacrylic acid binder solution in xylene.
*Comparative Examples

TABLE 5

| | relative Mw (via conventional GPC) | absolute Mw (via TD-GPC) | Difference factor |
|---|---|---|---|
| Binder D* | 70,000 | 79,750 | 1.1 |
| Binder E | 32,253 | 55,900 | 1.7 |

TABLE 5-continued

| | relative Mw (via conventional GPC) | absolute Mw (via TD-GPC) | Difference factor |
|---|---|---|---|
| Binder F | 75,716 | 184,400 | 2.4 |
| Binder G | 33,721 | 67,740 | 2.0 |
| Binder H* | 15,929 | 15,000 | 0.9 |

Binders E, F, and G: a 52% styrene-methacrylic acid-NBMA binder solution in xylene according to the present invention;
Binder D: Pliolite AC80 - a styrene acrylic binder commercially available from Omnova Solutions; and
Binder H: a 52% styrene-methacrylic acid binder solution in xylene.
*Comparative Examples The commercially available binder composition D has an alpha parameter of 0.690. While this value cannot be directly compared to the inventive binder composition (Binder compositions E, F and G) due to the differences in monomer composition, an alpha parameter of greater than 0.5, and the similarity between the relative Mw and the absolute Mw (see Table 5) suggest that the Binder composition D is a linear polymer. Thus, the binder composition without the crosslinkable acrylamide monomer (Binder composition H), which shows an alpha parameter of 0.622, is also likely to be a linear polymer. When compared to the alpha parameters of the binder compositions formed with the crosslinkable acrylamide monomer (Binder compositions E, F, and G), which show an average alpha parameter of 0.449, it is apparent that the inventive binder compositions of the present invention are highly branched. This data supports the hypothesis that the crosslinkable acrylamide monomer contributes to branching in these binder compositions.

Example D

The copolymer binder A (self-crosslinkable binder) from Example A was used to prepare an intumescent coating (inventive coating 4; Table 6), and is compared a commercially available styrene acrylic resin binder (comparative coating 5; Table 6). Testing results are shown in Table 7.

TABLE 6

| | | Parts By Weight (g) | |
|---|---|---|---|
| INGREDIENT | Ingredient Function | Coating 4 | Coating 5* |
| A | Binder | 21.5 | — |
| D | | — | 11.2 |
| Pentaerythritol | Carbon source | 8.6 | 8.4 |
| Ammonium Polyphosphate | Acid source | 26.4 | 26.1 |
| Melamine | Gas source | 8.6 | 8.4 |
| Xylene | Organic solvent | 17.7 | 28.0 |
| TiO$_2$ | Pigment | 6.4 | 6.4 |
| China Clay E | Inorganic filler | 1.0 | 2.0 |
| Chlorinated paraffin | Flame retardant | 8.5 | 8.5 |
| Fumed silica | Rheology modifier | 0.5 | 0.5 |
| Hydrogenated castor oil | Rheology modifier | 0.8 | 0.5 |

Binder A: a 52% styrene-methacrylic acid-NBMA binder solution in xylene according to the present invention;
Binder D: Pliolite AC80 - a styrene acrylic binder commercially available from Omnova Solutions.
*Comparative Example The formulations were prepared as indicated above in Example B for coatings 1, 2 and 3. The coatings were stored for 24 hours at 20° C. prior to application. The coatings were applied on mild steel 3 ft. IPE 400 beams. Three coats of 1000 microns dry film thickness each were applied with a 24 hour recoat interval at 20° C. The coating was applied with a 66:1 pneumatic airless spray pump, operating at 200 bar pressure using 4.19 inch and 5.19 inch nozzles. The samples were dried for 1 week at ambient conditions followed by 1 week at 40° C. Final film thickness of coating was measured before fire testing, as performed in accordance with EN13381-8. The test was stopped when a steel temperature of 620° C. was reached. The dry-to-touch times were measured in accordance with ASTM D1640 for 1000 micron wet coatings.

The char expansion factor was determined by measuring the volume increase of the char on the steel beam at 20 points equally spread over its surface. Char cracking and slumping were visually inspected. The char was removed from the steel and cut to assess adhesion and density of the air pockets. All physical properties were rated on a scale of 1 to 5, 1 being the worst and 5 being the best.

TABLE 7

|  | Coating 4 | Coating 5* |
|---|---|---|
| Fire performance (minutes) Time for steel to reach 620° C. according to EN13381-8 | 130 minutes | 119 minutes |
| Expansion loss after 48 hours 100% humidity exposure at 40° C. | 40% | 100% |
| Dry to touch according to ASTM D1640 - 1000 microns wet | 20 minutes | 30 minutes |
| Overcoat with self interval 1000 microns wet | 4.5 hours | 6 hours |
| Overcoat with topcoat interval 1000 microns dry | 36 hours | 48 hours |
| Char Expansion Factor | 54 | 80 |
| Char Cracking** | 4 | 2 |
| Char Slumping** | 5 | 3 |
| Char Adhesion** | 4 | 4 |
| Char Density** | 4 | 4 |

*Comparative Example
*Scale 1-5, 1 being the worst; 5 being the best result;
Coating 4 comprises Binder A: a 52% styrene-methacrylic acid-NBMA binder solution in xylene according to the present invention;
Coating 5 comprises Binder D: Pliolite AC80 - a styrene acrylic binder commercially available from Omnova Solutions.

The char expansion factor was determined by measuring the volume increase of the char on the steel beam at 20 points equally spread over its surface. Char cracking and slumping were visually inspected. The char was removed from the steel and cut to assess adhesion and density of the air pockets. All physical properties were rated on a scale of 1 to 5, 1 being the worst and 5 being the best.

The comparative data shows that an intumescent coating comprising the self-crosslinkable binder of the present invention (inventive coating 4) performs better than a coating prepared with a commercially available styrene-acrylic resin binder (comparative coating 5). The time to failure (fire performance) is improved as well as the char slumping, and dry times. That is, the time for the coated steel to reach the critical failure temperature of 620° C. (fire performance test) was greater than 120 minutes for the inventive coating 4.

The coating comprising the inventive binder A (Coating 4) also shows a significant improvement in hardness development when compared to coatings formulated with current styrene acrylic binders (Coating 5), as measured by Shore A hardness according to ASTM D2240. Table 8 shows that an intumescent coating comprising the inventive binder A achieves a shore A hardness of greater than 90 after 160 hours of drying time at ambient conditions, or 25 hours of drying time at 40° C.

TABLE 8

| | Shore A Hardness** | | | |
|---|---|---|---|---|
| | Ambient | | 40° C. | |
| Time (hours) | Coating 4 | Coating 5* | Coating 4 | Coating 5* |
| 23 | 66 | 59 | 93 | 85 |
| 65 | 67 | 63 | 95 | 88 |
| 89 | 72 | 65 | 96 | 88 |
| 113 | 80 | 66 | 96 | 92 |
| 137 | 88 | 70 | 96 | 92 |
| 161 | 92 | 74 | 97 | 92 |

*Comparative Example;
**Shore A Hardness measured according to ASTM D2240;
Coating 4 comprises Binder A: a 52% styrene-methacrylic acid-NBMA binder solution in xylene according to the present invention;
Coating 5 comprises Binder D: Pliolite AC80 - a styrene acrylic binder commercially available from Omnova Solutions.

It will be appreciated that the following embodiments and implementations are illustrative and various aspects of the invention may have applicability beyond the specifically described contexts. Furthermore, it is to be understood that these embodiments and implementations are not limited to the particular components, methodologies, or protocols described, as these may vary. The terminology used in the description is for the purpose of illustrating the particular versions or embodiments only, and is not intended to limit their scope in the present disclosure which will be limited only by the appended claims.

Aspects of the Invention

Each of the characteristics and examples described above, and combinations thereof, may be said to be encompassed by the present invention, which includes:

(1) A self-crosslinkable copolymer obtained by reacting a monomer mixture in the presence of an organic solvent, the monomer mixture comprising: (i) 0.5 to 10 percent by weight of a polymerizable ethylenically unsaturated carboxylic acid monomer; (ii) 50 to 90 percent by weight of a polymerizable ethylenically unsaturated monomer different from (i); and (iii) 7 to 50 percent by weight of a crosslinkable acrylamide monomer, wherein the percent by weight is based on the total weight of the monomer mixture, and wherein the copolymer has an acid value of less than 100 mg KOH/g and a weight average molecular weight of greater than 20,000 g/mol as determined by gel permeation chromatography relative to polystyrene standards.

(2) The copolymer of aspect 1, wherein the monomer mixture comprises (i) 3 to 8 percent by weight of the carboxylic acid monomer.

(3) The copolymer of aspects 1 or 2, wherein the monomer mixture comprises (ii) 60 to 80 percent by weight of the polymerizable ethylenically unsaturated monomer.

(4) The copolymer of any of aspects 1 to 3, wherein the monomer mixture comprises (iii) 10 to 35 percent by weight of the crosslinkable acrylamide monomer.

(5) The copolymer of any of aspects 1 to 4, wherein the acid monomer (i) comprises an α,β-monoethylenically unsaturated monocarboxylic or dicarboxylic acid, such (meth)acrylic acid, itaconic acid, maleic acid, fumaric acid, or combinations thereof.

(6) The copolymer of any of aspects 1 to 5, wherein the polymerizable ethylenically unsaturated monomer (ii) comprises styrene, α-methyl styrene, t-butylstyrene, vinyl toluene, or a combination thereof.

(7) The copolymer of any of aspects 1 to 6, wherein the crosslinkable acrylamide monomer (iii) comprises an N-(alkoxymethyl)acrylamide with a $C_1$- to $C_6$-alkyl radical, an N-(alkoxymethyl)methacrylamide with a $C_1$- to $C_6$-alkyl radical, or a combination thereof.

(8) The copolymer of aspect 7, wherein the crosslinkable acrylamide monomer (iii) comprises n-butoxymethyl acrylamide.

(9) The copolymer of any of aspects 1 to 8 having a weight average molecular weight of greater than 30,000 g/mol.

(10) The copolymer of any of aspects 1 to 9 having a weight average molecular weight of up to 500,000 g/mol such as up to 100,000 g/mol or up to 50,000 g/mol.

(11) The copolymer of any of aspects 1 to 10 having an acid value of less than 50 mg KOH/g, such as less than 20 mg KOH/g.

(12) The copolymer of any of aspects 1 to 11, wherein the copolymer has an alpha parameter derived from the Mark-Houwink equation of between 0.4 and 0.50.

(13) The copolymer of any of aspects 1 to 12, wherein the monomer mixture is reacted in the presence of a chain transfer agent (II) and a free radical initiator (III).

(14) The copolymer of aspect 13, wherein the chain transfer agent (II) comprises a mercaptan such as a mercaptan selected from octyl mercaptan, dodecyl mercaptan, tert-dodecyl mercaptan, pentaerythritol tetra(3-mercaptopropionate), or a combination thereof.

(15) The copolymer of aspects 13 or 14, wherein the free radical initiator (III) comprises 2,2-azobisisobutyronitrile, 2,2'-azobis(2,4-dimethylvaleronitrile), tertiary-butyl perbenzoate, tertiary-buty; peracetate, benzoyl peroxide, ditertiary-butyl peroxide, or a combination thereof.

(16) The copolymer of any of aspects 1 to 15, wherein the monomer mixture is reacted in the presence of an organic solvent by a solution polymerization technique.

(17) The copolymer of aspect 16 which is obtained by reacting a monomer mixture (I) comprising:
 (i) 0.5 to 10 percent by weight, such as 0.5 to 5 percent by weight, of a polymerizable ethylenically unsaturated carboxylic acid monomer, (ii) 20 to 80 percent by weight, such as 20 to 60 percent by weight, of a polymerizable ethylenically unsaturated monomer different from (i), and (iii) 5 to 50 percent by weight, such as 5 to 30 percent by weight, of a crosslinkable acrylamide monomer,
in the presence of
 (II) 0.1 to 5 percent by weight, such as 0.1 to 1 percent by weight of a chain transfer agent,
 (III) 0.5 to 8 percent by weight, such as 0.5 to 5 percent by weight of a free radical initiator, and
 (IV) 20 to 70 percent by weight, such as 30 to 50 of an organic solvent, wherein each percent by weight is based on the total weight of components (I)(i), (I)(ii), (I)(iii), (II), (III), and (IV).

(18) A self-crosslinkable binder composition comprising the self-crosslinkable copolymer according to any of aspects 1 to 17 and an organic solvent, wherein the copolymer is typically dissolved in the organic solvent.

(19) The binder composition of aspect 18 being the direct product of the solution polymerization process described in aspects 16 or 17.

(20) The binder composition of aspects 18 or 19 having a solids content of 30 percent by weight or more, such as 50 percent by weight or more, based on the total weight of the binder composition.

(21) Use of the self-crosslinkable copolymer of any of aspects 1 to 17 or the self-crosslinkable binder composition of any of aspects 18 to 20 in an intumescent coating providing a substrate with fire retardancy.

(22) An intumescent coating composition comprising: (a) the self-crosslinkable copolymer according to any of aspects 1 to 17 or the self-crosslinkable binder composition according to any of aspects 18 to 20; (b) an acid source; (c) a carbon source; and (d) a gas source.

(23) The intumescent coating composition of aspect 22, comprising: (a) 15 to 30 weight percent of the self-crosslinkable binder composition; (b) 5 to 40 weight percent of the acid source; (c) 0.1 to 20 weight percent of the carbon source; and (d) 3 to 20 weight percent of the gas source, wherein the weight percent is based on the total weight of the intumescent coating composition.

(24) The intumescent coating composition of aspects 22 or 23, further comprising (e) a pigment, such as titanium dioxide.

(25) The intumescent coating composition of aspect 24, wherein the pigment is included at 3 to 20 percent by weight, based on the total weight of the coating composition.

(26) The intumescent coating composition of any of aspects 24 or 25 having a pigment volume concentration (PVC) (volume of pigment compared to the volume of all solids) of 30 to 80 percent, such as from 55 to 70 percent.

(27) The intumescent coating composition of any of aspects 22 to 26, comprising (f) (additional) organic solvent.

(28) The intumescent coating composition of aspect 27, wherein the organic solvent is included at 2 to 40 percent by weight, which is in addition to any solvent supplied with the binder composition, based on the total weight of the coating composition.

(29) The intumescent coating composition of any of aspects 22 to 28, wherein the acid source is ammonium polyphosphate.

(30) The intumescent coating composition of any of aspects 22 to 29, wherein the carbon source comprises an organic polyhydroxy compound.

(31) The intumescent coating composition of any of aspects 22 to 30, wherein the gas source is selected from melamine, melamine salts, melamine derivatives, or combinations thereof.

(32) The intumescent coating composition of any of aspects 22 to 31, further comprising one or more additives selected from inorganic nucleating agents, rheology modifiers, inorganic fillers, and flame retardants.

(33) The intumescent coating composition of any of aspects 22 to 32, having a solids content by weight of 75% or greater, based on the total weight of the coating composition.

(34) An intumescent coating prepared from the intumescent coating composition of any of aspects 22 to 33 by applying it to a substrate and drying it, wherein the coating achieves a shore A hardness of greater than 90 as measured according to ASTM D2240 after 160 hours of drying time at ambient conditions (22.2° C.) or 25 hours of drying time at 40° C.

(35) An intumescent coating prepared from the intumescent coating composition of any of aspects 22 to 33 by applying it to a substrate and drying it, wherein the coating has a time to 620° C. of greater than 50 minutes for a 1000 μm coating on a W6×16 mild steel H-column, or a time to 620° C. of greater than 120 minutes for a 3000 μm coating on a 3 ft IPE 400 beams, tested according to EN13381-8 after 1 week of drying time at 22° C. followed by 1 week of drying time at 40° C.

(36) A substrate coated at least in part with the intumescent coating composition of any of aspects 22 to 33.

What is claimed is:

1. An intumescent coating composition comprising:
   (a) a self-crosslinkable binder composition comprising a copolymer obtained by reacting a monomer mixture in the presence of an organic solvent, the monomer mixture comprising:
      (i) 0.5 to 10 percent by weight of a polymerizable ethylenically unsaturated carboxylic acid monomer;
      (ii) 50 to 90 percent by weight of a polymerizable ethylenically unsaturated monomer different from (i); and
      (iii) 7 to 50 percent by weight of a crosslinkable acrylamide monomer,
      wherein the percent by weight is based on the total weight of the monomer mixture, and wherein the binder has an acid value of less than 100 mg KOH/g and the copolymer has a weight average molecular weight of greater than 20,000 as determined by gel permeation chromatography relative to polystyrene standards with the unit of g/mol;
   (b) an acid source;
   (c) a carbon source; and
   (d) a gas source.

2. The intumescent coating composition of claim 1, further comprising (e) a pigment, an inorganic filler, or an inorganic nucleating agent.

3. The intumescent coating composition of claim 1, wherein the self-crosslinkable binder composition comprises at least 30% solids by weight of the copolymer, based on the total weight of the self-crosslinkable binder (a).

4. The intumescent coating composition of claim 1, wherein the polymerizable ethylenically unsaturated carboxylic acid monomer (i) comprises (meth)acrylic acid, itaconic acid, maleic acid, fumaric acid, or combinations thereof.

5. The intumescent coating composition of claim 1, wherein the polymerizable ethylenically unsaturated monomer (ii) comprises styrene, α-methyl styrene, t-butylstyrene, vinyl toluene, or a combination thereof.

6. The intumescent coating composition of claim 1, wherein the crosslinkable acrylamide monomer (iii) comprises n-butoxymethyl acrylamide, which is present in an amount of 10 to 30 percent by weight based on the total weight of the monomer mixture.

7. The intumescent coating composition of claim 1, wherein the coating composition, following application to a substrate, achieves a shore A hardness of greater than 90 as measured according to ASTM D2240 after 160 hours of drying time at ambient conditions (22.2° C.) or 25 hours of drying time at 40° C.

8. The intumescent coating composition of claim 1, wherein the coating composition, following application to a substrate, has a time to 620° C. of greater than 50 minutes for a 1000 um coating on a W6×16 mild steel H-column tested according to EN13381-8.

9. A substrate coated at least in part with the intumescent coating composition of claim 1.

* * * * *